US011453436B2

United States Patent
Argenziano et al.

(10) Patent No.: US 11,453,436 B2
(45) Date of Patent: Sep. 27, 2022

(54) COLD PLANER MULTI CYLINDER ADJUSTABLE STEERING

(71) Applicant: Caterpillar Paving Products Inc., Brooklyn Park, MN (US)

(72) Inventors: Nicholas J. Argenziano, Otsego, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 291 days.

(21) Appl. No.: 16/872,790

(22) Filed: May 12, 2020

(65) Prior Publication Data

US 2021/0354749 A1 Nov. 18, 2021

(51) Int. Cl.
*B62D 5/09* (2006.01)
*B62D 11/20* (2006.01)
*B62D 7/15* (2006.01)
*E01C 23/08* (2006.01)
*B62D 5/14* (2006.01)
*E01C 23/088* (2006.01)

(52) U.S. Cl.
CPC ............... *B62D 5/09* (2013.01); *B62D 5/14* (2013.01); *B62D 7/1509* (2013.01); *B62D 11/20* (2013.01); *E01C 23/088* (2013.01); *E01C 23/08* (2013.01)

(58) Field of Classification Search
CPC ........ E01C 23/08; B62D 7/1509; B62D 11/20
USPC ....................................................... 180/442
See application file for complete search history.

(56) References Cited

U.S. PATENT DOCUMENTS

| 4,190,130 | A | 2/1980 | Beck |
| 4,716,981 | A | 1/1988 | Murao |
| 5,489,113 | A | 2/1996 | Torborg |
| 5,758,740 | A | 6/1998 | Park |
| 7,942,604 | B2 | 5/2011 | Willis et al. |
| 9,926,004 | B2 | 3/2018 | Blond |
| 2013/0158802 | A1 | 6/2013 | Miller et al. |

FOREIGN PATENT DOCUMENTS

JP 2007203963 8/2007

*Primary Examiner* — Kevin Hurley
*Assistant Examiner* — Hosam Shabara
(74) *Attorney, Agent, or Firm* — Schwegman Lundberg & Woessner, P.A.

(57) ABSTRACT

A milling machine can include a frame; at least two tracks coupled to the frame for propelling the milling machine; first and second hydraulic cylinders configured to steer each of the at least two tracks, respectively; an adjustable hydraulic tie rod extending between the at least two tracks; first and second steering collars coupled to the each of the tracks to move the tracks, wherein the first hydraulic cylinder is coupled to the first steering collar and the second hydraulic cylinder is coupled to the second steering collar, and wherein the adjustable hydraulic tie rod is coupled to both of the steering collars; one or more sensors to determine the positions of the at least two tracks; and a hydraulic steering control system coupled to the first and second hydraulic cylinders and the adjustable hydraulic tie rod and configured to vary a steering mode of the at least two tracks between a parallel steering mode and an Ackerman steering mode, wherein if one of the one or more sensors fails, the hydraulic steering control system defaults to move the at least two tracks into the Ackerman steering mode.

20 Claims, 4 Drawing Sheets

COLD PLANER MULTI CYLINDER ADJUSTABLE STEERING

TECHNICAL FIELD

The present disclosure generally relates to a milling machine such as a cold planer. More particularly, the present disclosure relates to a system and method for steering the milling machine.

BACKGROUND

Milling machines can include machines such as cold planers and reclaimers. Cold planers are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly, this power is further transferred to the cutting rotor, thereby rotating the cutting rotor about its axis. As the rotor rotates, its cutting bits engage the hardened asphalt, concrete or other materials of an existing surface of a paved area, thereby removing layers of these existing structures. The spinning action of the cutting bits transfers these removed layers to the conveyor system which transports the removed material to a separate powered machine such as a haul truck for removal from a work site.

Larger road milling machines require multiple cylinders to provide enough force to steer the tracks. Having multiple cylinders can limit changing from Ackerman steering to parallel steering, which is used to improve machine maneuverability.

US 2013/0158802 discloses a steering system for a crawler track machine having multiple steering modes.

SUMMARY

In an example according to this disclosure, a milling machine can include a frame; at least two tracks coupled to the frame for propelling the milling machine; first and second hydraulic cylinders configured to steer each of the at least two tracks, respectively; an adjustable hydraulic tie rod extending between the at least two tracks; first and second steering collars coupled to the each of the tracks to move the tracks, wherein the first hydraulic cylinder is coupled to the first steering collar and the second hydraulic cylinder is coupled to the second steering collar, and wherein the adjustable hydraulic tie rod is coupled to both of the steering collars; one or more sensors to determine the positions of the at least two tracks; and a hydraulic steering control system coupled to the first and second hydraulic cylinders and the adjustable hydraulic tie rod and configured to vary a steering mode of the at least two tracks between a parallel steering mode and an Ackerman steering mode, wherein if one of the one or more sensors fails, the hydraulic steering control system defaults to move the at least two tracks into the Ackerman steering mode.

In one example, a steering control system for a milling assembly can include first and second hydraulic cylinders configured to steer each of at least two tracks of the milling assembly, wherein the first and second cylinders are coupled to first and second steering collars coupled to each of the first and second tracks, respectively; an adjustable hydraulic tie rod extending between the at least two tracks, wherein the adjustable hydraulic tie rod is coupled to each of the first and second steering collars; and a hydraulic steering control system including one or more sensors to determine the positions of the at least two tracks, the hydraulic steeling control system being coupled to the first and second hydraulic cylinders and the adjustable hydraulic tie rod and configured to vary a steering mode of the at least two tracks between a parallel steering mode and an Ackerman steering mode, wherein if one of the one or more sensors fails, the hydraulic steering control system defaults to move the at least two tracks into the Ackerman steering mode.

In one example, a method of controlling steering of a milling machine can include coupling first and second hydraulic cylinders configured to steer each of at least two tracks of the milling machine to first and second steering collars coupled to each of the first and second tracks, respectively; coupling an adjustable hydraulic tie rod extending between the at least two tracks to each of the first and second steeling collars; and activating a hydraulic steering control system including one or more sensors to determine the positions of the at least two tracks, the hydraulic steeling control system being coupled to the first and second hydraulic cylinders and the adjustable hydraulic tie rod and configured to vary a steering mode of the at least two tracks between a parallel steering mode and an Ackerman steering mode, wherein if one of the one or more sensors fails, the hydraulic steering control system defaults to move the at least two tracks into the Ackerman steering mode.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
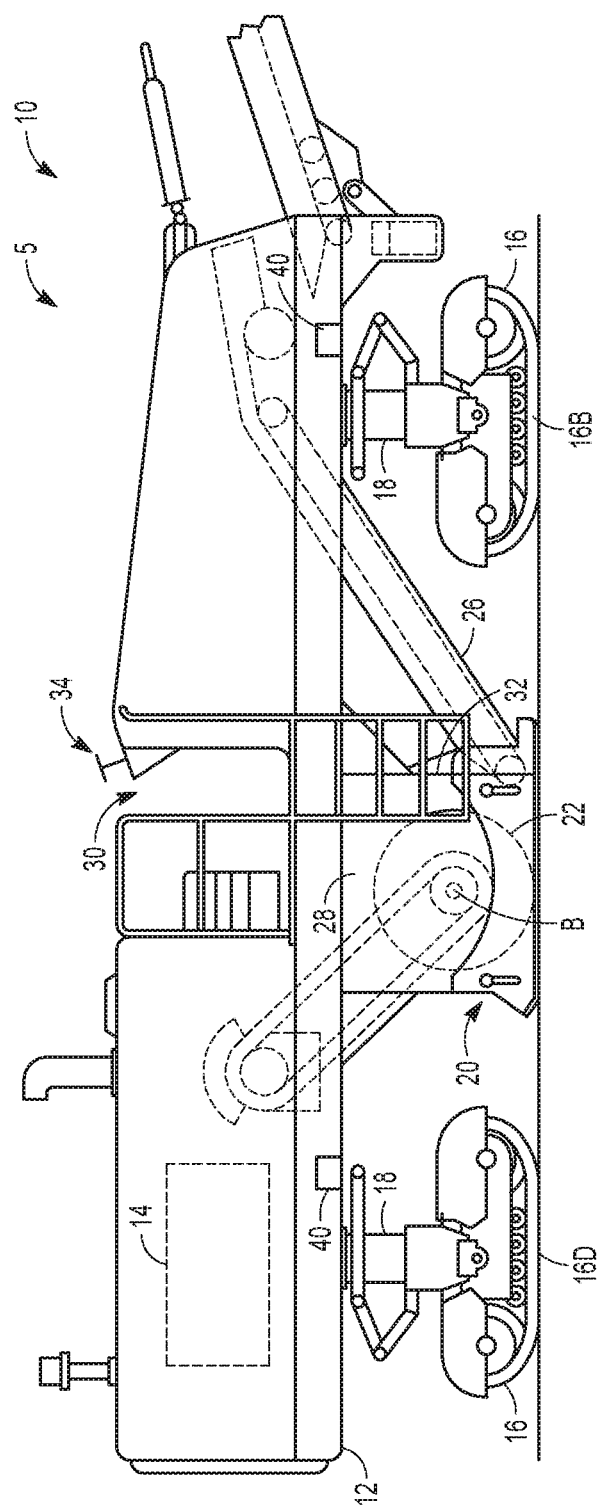
FIG. 1 shows a side view of a milling machine, in accordance with one embodiment.

FIG. 1 shows a side view of a milling machine 5, in accordance with one embodiment. In this example, the milling machine 5 can be a cold planer 10. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as four tracks 16A, 16B, 16C, and 16D (tracks 16A and 16C are hidden in this view) The lifting columns 18 are configured to raise and lower the frame 12 relative to the transportation devices and the ground. Also, the milling machine can include one or more sensors 40 to determine the positions of the tracks 16A, 16B, 16C, and 16D for steering purposes, as will be discussed below.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum or housing axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

The drum housing 28 includes front and rear walls, and a top cover positioned above the cutting rotor 22. Furthermore, the drum housing 28 includes lateral covers on the left and right sides of the cutting rotor 22 with respect to a travel direction of the cold planer 10. The drum housing 28 is open toward the ground so that the cutting rotor 22 can engage in the ground from the drum housing 28. The drum housing includes the discharge port 32 in a front wall to discharge material to the first stage conveyor 26, which is located at or near the discharge port 32.

The cold planer 10 further includes an operator station or platform 30 including an operator interface for inputting commands to a control system for controlling the cold planer 10, and for outputting information related to an operation of the cold planer 10. For example, the operator station can include a steering mechanism 34, such as a steering wheel or a joystick.

The milling machine 5 can utilize different steering modes, including, for example, an Ackerman steering mode as well as a parallel steering mode. In an Ackerman steering mode (also called coordinate steering), the machine will move in a circular turning direction about a single radial point, as dictated by orientation of the machine's front and rear tracks.

In a parallel steering mode (also called crab steering) all tracks of the machine are oriented parallel to one another, and thus aligned to collectively roll in a single direction. More particularly, during the parallel steering mode, the machine travels linearly in the direction of its parallel oriented tracks, albeit at an angle relative to a longitudinal centerline of the machine.

As noted, larger road milling machines require multiple cylinders to provide enough force to steer the tracks. Having multiple cylinders can limit changing from Ackerman steering to parallel steering. Some steering systems can utilize position sensors to determine the steer angles and position of the tracks with relation to each other to maintain Ackerman or parallel steering. However, if a sensor fails, the tracks can become improperly offset from each other causing high loads and damage to the machine.

As will be discussed below, the present steering system includes control valves and an adjustable tie rod. The control valves and the adjustable tie rod can lock the flow to each cylinder to move each track to the desired position while steering. In the event of a sensor fault the machine steering control defaults to Ackerman steering (coordinate or front steer only). Flow is allowed into the front tie rod cylinder allowing it to fully extend and cannot retract due to being blocked by tie rod locking valve. This keeps or puts the steeling into Ackerman steering mode.

Figure 2:
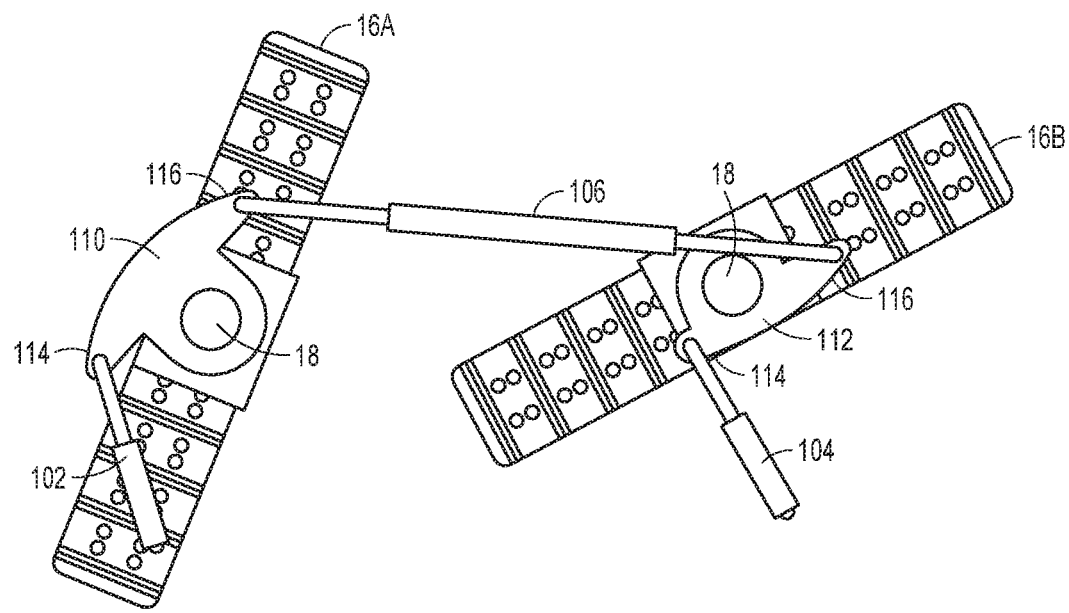
FIG. 2 shows a top view of a steering system, in accordance with one embodiment.

FIG. 2 shows a top view of a steeling system, in accordance with one embodiment. Specifically, FIG. 2 shows the steering of the tracks 16A and 16B in an Ackerman steering mode. In this example only the front two tracks 16A and 16B are shown, however, the rear tracks 16C, 16D can also have a similar steering system. Here, the milling machine includes first and second hydraulic cylinders 102, 104 which are configured to steer each of the at least two tracks 16A, 16B, respectively. The first and second hydraulic cylinders 102, 104 can have one end coupled to the frame 12 (FIG. 1) and the other end coupled to respective steering collars 110, 112.

The first and second steering collars 110, 112 can be coupled to the each of the tracks 16A, 16B to move the tracks 16A, 16B. Here, the first hydraulic cylinder 102 is coupled to the first steering collar 110 and the second hydraulic cylinder 104 is coupled to the second steeling collar 112

The steering system further includes an adjustable hydraulic tie rod 106 extending between the at least two tracks 16A, 16B. Here, the adjustable hydraulic tie rod 106 is coupled to both of the steering collars 110, 112. The steering collars 110, 112 can include a central collar region coupled to the lifting column 18 of the machine 5 and a first extension 114 to couple to the hydraulic cylinder 102, 104 and a second extension 116 to couple to the adjustable hydraulic tie rod 106. As the hydraulic cylinders 102, 104 and the adjustable hydraulic tie rod 106 extend and retract, they twist the first and second steering collars 110, 112 so as to turn the tracks 16A, 16B as desired.

The adjustable hydraulic tie rod can be fixed in a predetermined position in the machine 5 during any Ackerman coordinated left or right turn. In such case, and during any such non-crab or coordinated mode turn, the tie rod 60 may be provided to have a length equal to a predetermined steering linkage-fixed value.

The machine 5 of the present disclosure can have at least two Ackerman steering modes. The first is the four-track (or all track) steering mode. The second is an independent front track steering mode in which only the front tracks 16A, 16B are intentionally manipulated by an operator, and during which time the rear tracks 16C, 16D may be normally biased to a zero turn angle.

Figure 3:
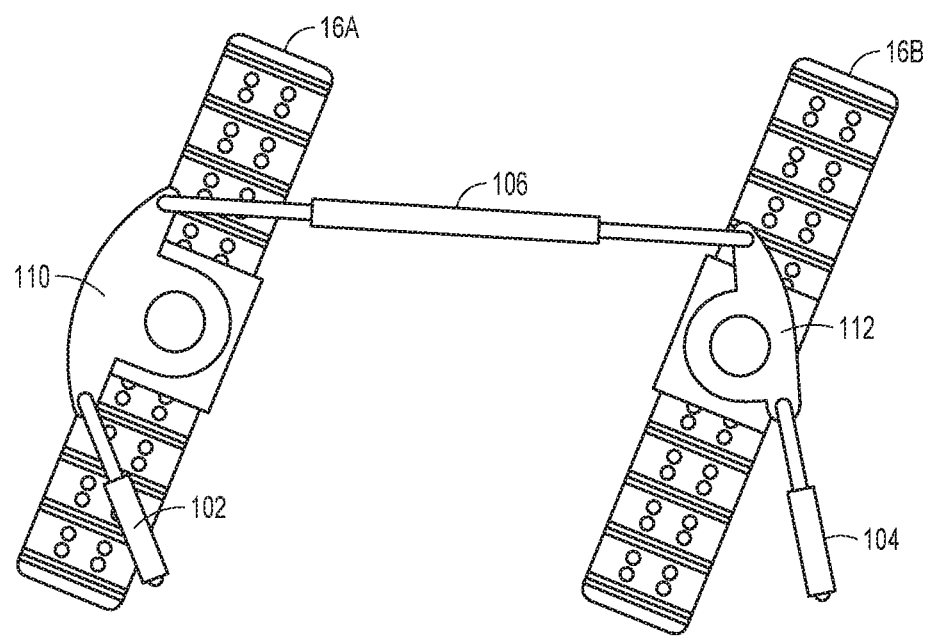
FIG. 3 shows a top view of a steering system, in accordance with one embodiment.

FIG. 3 shows a top view of a steeling system, in accordance with one embodiment. The is an example of the parallel steering mode. For the parallel steering mode, the adjustable hydraulic tie rod 106 is configured to actively expand or retract the tie rod ends as required for maintaining the tracks 16A and 16B in parallel alignment with one another during any executable crab mode angle. For example, FIG. 5 shows an example of different tie rod lengths for different turning angles.

Figure 5:
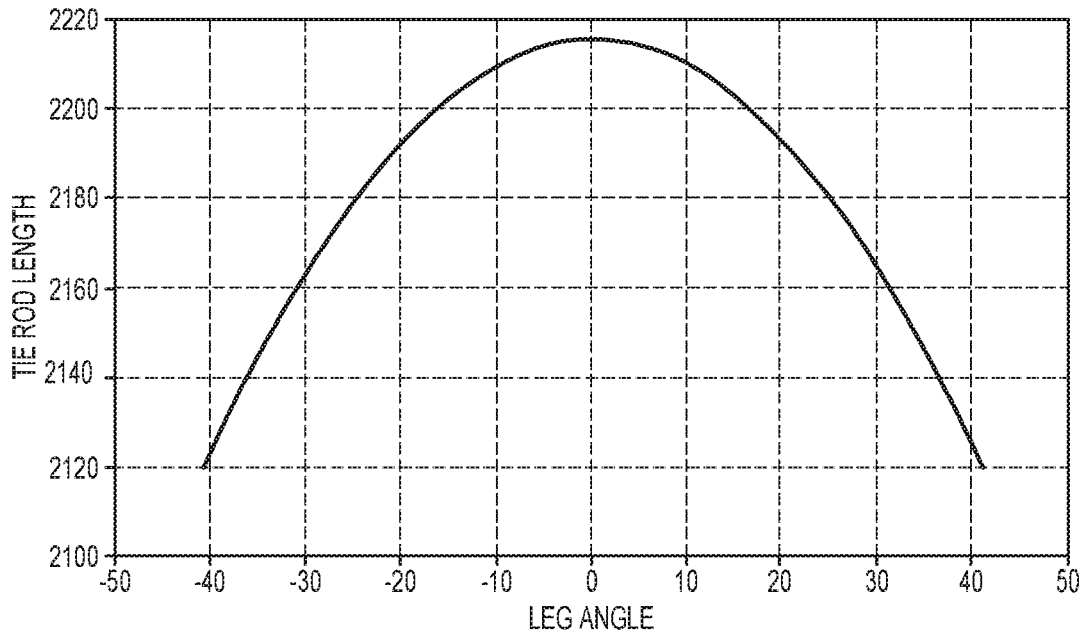
FIG. 5 shows a tie rod length chart for parallel steering, in accordance with one embodiment.

In an example, a computerized system containing lookup tables, as in FIG. 5, may be employed to provide parallel steer track angles up to the maximum available crab angle of steer. Moreover, the sensors (FIG. 1) can be used to sense the positions of the tracks 16A and 16B so as to provide improved performance to keep the tracks parallel to each other.

Figure 4:
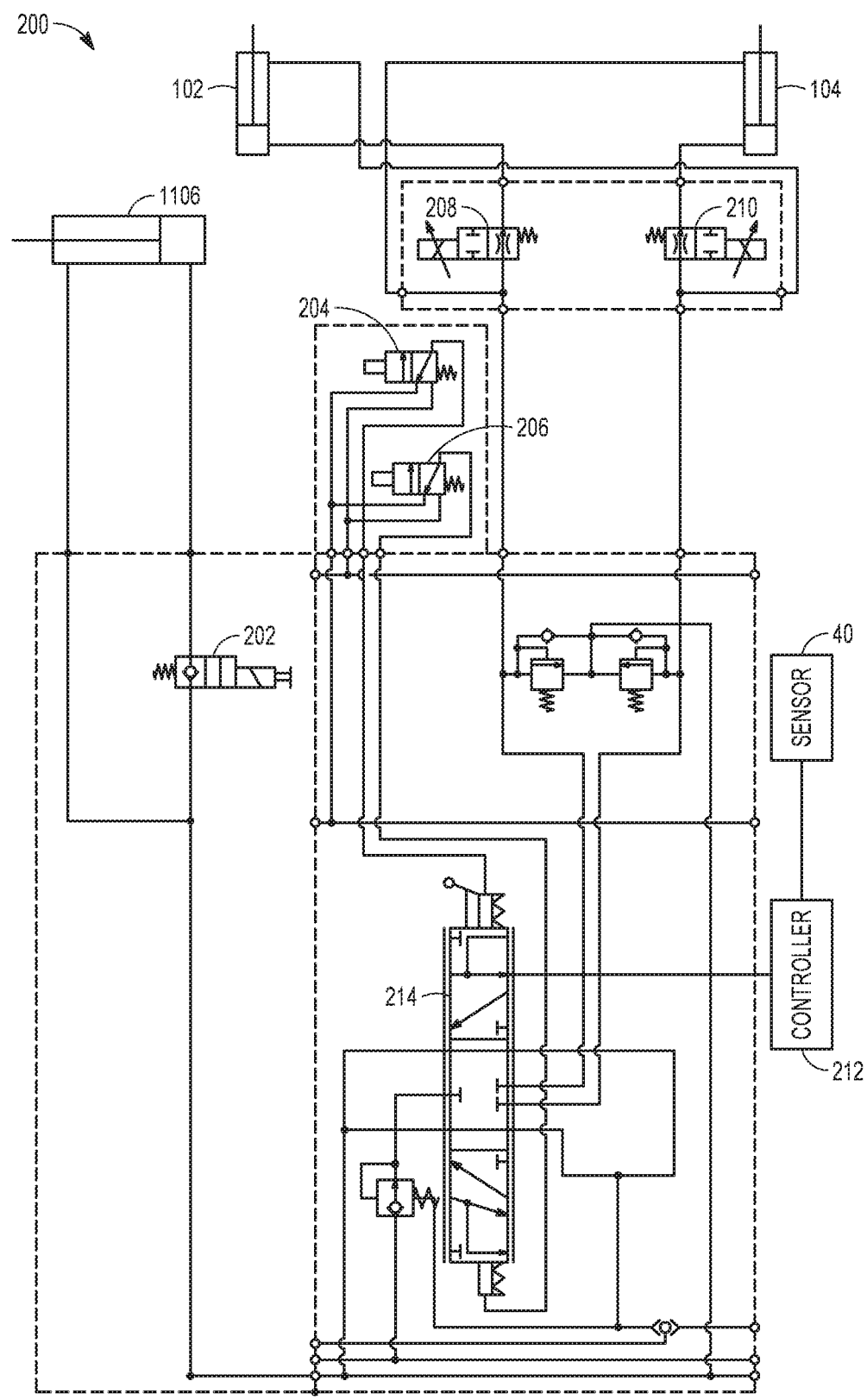
FIG. 4 shows a schematic view of a hydraulic steering control system, in accordance with one embodiment.

FIG. 4 shows a schematic view of a hydraulic steering control system 200, in accordance with one embodiment. Here the overall system includes the one or more sensors 40 to determine the positions of the at least two tracks 16A, 16B, and a controller 212 coupled to the one or more sensors 40 and coupled to the hydraulic steering control system 200.

Here, the hydraulic steering control system 200 can be coupled to the first and second hydraulic cylinders 102, 104 and the adjustable hydraulic tie rod 106 and configured to vary a steering mode of the at least two tracks 16A, 16B between a parallel steering mode and an Ackerman steering mode. The system is designed so that if one of the one or more sensors 40 fails, the hydraulic steering control system 200 defaults to move the at least two tracks 16A, 16B into the Ackerman steering mode.

Accordingly, the hydraulic steering control system 200 can include a tie rod check valve 202 coupled to the adjustable hydraulic tie rod 106. The tie rod check valve 202 is a normally closed valve and if the machine 5 is put into parallel steering mode, the tie rod check valve 202 is energized to allow the adjustable hydraulic tie rod 106 to constantly adjust to keep the first and second tracks 16A, 16B parallel. Again, the sensors 40 can be used to help the adjust the tracks to keep the tracks in parallel.

However, when the hydraulic steering control system 200 detects that one of the one or more sensors 40 fails, the controller 212 de-energizes the tie rod check valve 202 such that the tie rod check valve 202 closes and such that the adjustable hydraulic tie rod 106 cannot retract due to being blocked by the tie rod check valve 202, thus putting the machine 5 into the Ackerman steering mode.

In general, the hydraulic steering control system 200 can include a first valve 204 and a second valve 206 to control left or right steering by controlling flow into a third valve 208 and a fourth valve 210 via a front steer spool valve 214. The third valve 208 and a fourth valve 210 then deliver hydraulic fluid to the first and second hydraulic cylinders 102, 104, respectively. The third valve 208 and the fourth valve 210 are normally open valves to allow proportional fluid flow through to the first and second hydraulic cylinders 102, 104 to turn the first and second tracks 16A, 16B either left or tight as instructed by the operator.

In this example, the hydraulic steering control system 200 can include the front steer spool valve 214 which is configured to control hydraulic flow to the tie rod check valve 202, the first valve 204, the second valve 206, the third valve 208, and the fourth valve 209 and to receive instructions from the controller 212 regarding the selected steering mode.

The one or more sensors 40 can include mechanical sensors, optical sensors, or position sensors. For example, the one or more sensors 40 can include one or more of actuator position sensors to determine how far the hydraulic cylinders are extended or other sensors such as pressure sensors, optical sensors, laser sensors, and the like. Or the sensor can be a mechanical sensor or optical sensor evaluating the position of the track.

In an example of operation using the hydraulic steering system 200, if the machine is put into Ackerman steering mode, then the first valve 204 is opened to allow the tracks to turn right or the second valve 206 is opened if steering to the left. In both cases, the third valve 208 and fourth valve 210 allow flow through as needed to do the degree of turning desired by the operator. The tie rod check valve 202 is closed so that the adjustable hydraulic tie rod 106 remains at a predetermined fixed length.

If the machine is put into parallel steeling mode, the tie rod check valve 202 is opened to allow for constant adjustment of the adjustable hydraulic tie rod 106. For a steer right, the first valve 204 is opened and the position of the fourth valve 210 is based on the desired stroke of the cylinders determined by the position sensors 40. For a left turn, the first valve 204 is closed and the second valve 206 is opened and the position of the third valve 208 is based on the desired stroke of the cylinders determined by the position sensors 40.

In event of a failure of one of the sensors 40, the machine controller cannot determine each track position so as to keep the tracks parallel. Accordingly, when a sensor 40 faults, the controller 212 defaults to Ackerman steering (coordinate or front steer only). The tie rod check valve 202 is de-energized. This allows flow into the adjustable hydraulic tie rod 106 allowing the tie rod to fully extend and not able to retract due to the tie rod check valve 202. This operation puts the steering into Ackerman steering mode.

INDUSTRIAL APPLICABILITY

The present system is applicable to a milling machine such as a cold planer. The milling assembly is suitable as a milling unit of a cold planer for removing at least part of a surface of a paved area such as a road, bridge, and a parking lot.

As noted, when the machine is in a parallel steering mode, if a sensor fails, the tracks can become improperly offset from each other causing high loads and damage to the machine.

Figure 6:
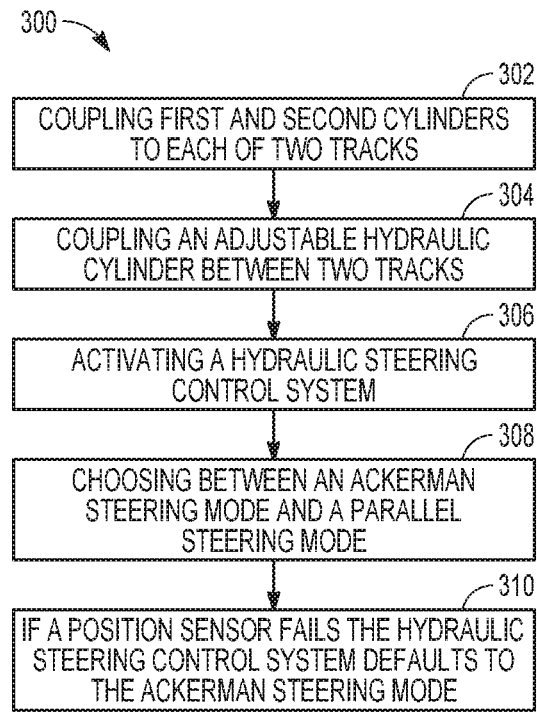
FIG. 6 shows a flowchart of a method of steering, in accordance with one embodiment.

FIG. 6 shows a flowchart of a method of steering 300, in accordance with one embodiment. The method 300 can include coupling (302) first and second hydraulic cylinders 102, 104 configured to steer each of at least two tracks 16A, 16B of the milling machine 5 to first and second steering collars 110, 112 coupled to each of the first and second tracks 16A, 16B, respectively.

The method further includes coupling (304) an adjustable hydraulic tie rod 106 extending between the at least two tracks 16A, 16B to each of the first and second steering collars 110, 112.

The method 300 further includes activating (306) a hydraulic steering control system 200 including one or more sensors 40 to determine the positions of the at least two tracks 16A, 16B. The hydraulic steering control system 200 is coupled to the first and second hydraulic cylinders 102, 104 and the adjustable hydraulic tie rod 106 and configured to vary a steering mode (308) of the at least two tracks 16A, 16B between a parallel steering mode and an Ackerman steering mode, wherein if one of the one or more sensors 40 fails (310), the hydraulic steering control system 200 defaults to move the at least two tracks 16A, 16B into the Ackerman steering mode.

As discussed above, the hydraulic steering control system 200 can include the tie rod check valve 202 coupled to the adjustable hydraulic tie rod 106, wherein the tie rod check valve 202 is a normally closed valve and if the machine 5 is put into parallel steering mode, the tie rod check valve 202 is energized to allow the adjustable hydraulic tie rod 106 to constantly adjust to keep the first and second tracks 16A, 16B parallel.

When the hydraulic steering control system 200 detects that one of the one or more sensors 40 fails, the tie rod check valve 202 is de-energized such that the tie rod check valve 202 closes and such that the adjustable hydraulic tie rod 106 cannot retract due to being blocked by the tie rod check valve 202, thus putting the machine 5 into the Ackerman steering mode.

Further, the hydraulic steering control system 200 can include the first valve 204 and the second valve 206 to control left or right steering by controlling flow into a third valve 208 and a fourth valve 210 which deliver hydraulic fluid to the first and second hydraulic cylinders 102, 104, respectively. The third valve 208 and the fourth valve 210 are normally open valves to allow proportional fluid flow through to the first and second hydraulic cylinders 102, 104 to turn the first and second tracks 16A, 16B either left or right as instructed by the operator.

The system can include the controller 212 coupled to the one or more sensors 40 and coupled to the hydraulic steering control system 200, and wherein the hydraulic steering control system 200 includes a front steer spool valve 214 configured to control hydraulic flow to the tie rod check valve 202, the first valve 204, the second valve 206, the third valve 208, and the fourth valve 210 and to receive instructions from the controller 212 regarding the selected steering mode.

The above detailed description is intended to be illustrative, and not restrictive. The scope of the disclosure should, therefore, be determined with references to the appended claims, along with the full scope of equivalents to which such claims are entitled.

What is claimed is:

1. A milling machine comprising:
    a frame;
    at least two tracks coupled to the frame for propelling the milling machine;
    first and second hydraulic cylinders configured to steer each of the at least two tracks, respectively;
    an adjustable hydraulic tie rod extending between the at least two tracks;
    first and second steering collars coupled to the each of the tracks to move the tracks, wherein the first hydraulic cylinder is coupled to the first steering collar and the second hydraulic cylinder is coupled to the second steering collar, and wherein the adjustable hydraulic tie rod is coupled to both of the steering collars;
    one or more sensors to determine the positions of the at least two tracks; and
    a hydraulic steering control system coupled to the first and second hydraulic cylinders and the adjustable hydraulic tie rod and configured to vary a steering mode of the at least two tracks between a parallel steering mode and an Ackerman steeling mode, wherein if one of the one or more sensors fails, the hydraulic steering control system defaults to move the at least two tracks into the Ackerman steering mode.

2. The milling machine of claim 1, wherein the hydraulic steering control system includes a tie rod check valve coupled to the adjustable hydraulic tie rod, wherein the tie rod check valve is a normally closed valve and if the machine is put into parallel steering mode, the tie rod check valve is energized to allow the adjustable hydraulic tie rod to constantly adjust to keep the at least two tracks parallel.

3. The milling machine of claim 1, wherein the hydraulic steering control system includes a tie rod check valve coupled to the adjustable hydraulic tie rod, wherein the tie rod check valve is a normally closed valve and when the hydraulic steeling control system detects that one of the one or more sensors fails, the tie rod check valve is de-energized such that the tie rod check valve closes and such that the adjustable hydraulic tie rod cannot retract due to being blocked by the tie rod check valve, thus putting the machine into the Ackerman steering mode.

4. The milling machine of claim 1, wherein the hydraulic steering control system includes a first valve and a second valve to control left or right steering by controlling flow into a third valve and a fourth valve which deliver hydraulic fluid to the first and second hydraulic cylinders, respectively, the third valve and the fourth valve are normally open valves to allow proportional fluid flow through to the first and second hydraulic cylinders to turn the at least two tracks either left or right as instructed by the operator.

5. The milling machine of claim 1, wherein the milling machine includes a controller coupled to the one or more sensors and coupled to the hydraulic steering control system.

6. The milling machine of claim 4, wherein the hydraulic steering control system includes a front steer spool valve configured to control hydraulic flow to a tie rod check valve, the first valve, the second valve, the third valve, and the fourth valve and to receive instructions from a controller coupled to the one or more sensors and coupled to the hydraulic steeing control system regarding the selected steering mode.

7. The milling machine of claim 1, wherein the at least two tracks includes four tracks with a pair of rear tracks and a pair of front tracks.

8. The milling machine of claim 1, wherein the steering collar include a central collar region coupled to the lifting column of the machine and a first extension to couple to the hydraulic cylinder and a second extension to couple to the adjustable hydraulic tie rod.

9. The milling machine of claim 1, wherein the one or more sensors include mechanical sensors, optical sensors, or position sensors.

10. A steering control system for a milling assembly, comprising:
    first and second hydraulic cylinders configured to steer each of at least two tracks of the milling assembly, wherein the first and second cylinders are coupled to first and second steeling collars coupled to each of the at least two tracks, respectively;
    an adjustable hydraulic tie rod extending between the at least two tracks, wherein the adjustable hydraulic tie rod is coupled to each of the first and second steering collars; and
    a hydraulic steering control system including one or more sensors to determine the positions of the at least two tracks, the hydraulic steering control system being coupled to the first and second hydraulic cylinders and the adjustable hydraulic tie rod and configured to vary a steering mode of the at least two tracks between a parallel steeling mode and an Ackerman steeling mode, wherein if one of the one or more sensors fails, the hydraulic steering control system defaults to move the at least two tracks into the Ackerman steering mode.

11. The steering control system of claim 10, wherein the hydraulic steering control system includes a tie rod check valve coupled to the adjustable hydraulic tie rod, wherein the tie rod check valve is a normally closed valve and if the machine is put into the parallel steering mode, the tie rod check valve is energized to allow the adjustable hydraulic tie rod to constantly adjust to keep the at least two tracks parallel.

12. The steering control system of claim 10, wherein the hydraulic steering control system includes a tie rod check valve coupled to the adjustable hydraulic tie rod, wherein the tie rod check valve is a normally closed valve and when the hydraulic steeling control system detects that one of the one or more sensors fails, the tie rod check valve is de-energized such that the tie rod check valve closes and such that the adjustable hydraulic tie rod cannot retract due to being blocked by the tie rod check valve, thus putting the machine into the Ackerman steering mode.

13. The steering control system of claim 10, wherein the hydraulic steeling control system includes a first valve and a second valve to control left or right steering by controlling flow into a third valve and a fourth valve which deliver hydraulic fluid to the first and second hydraulic cylinders, respectively, the third valve and the fourth valve are normally open valves to allow proportional fluid flow through to the first and second hydraulic cylinders to turn the at least two tracks either left or right as instructed by the operator.

14. The steering control system of claim 10, wherein the milling machine includes a controller coupled to the one or more sensors and coupled to the hydraulic steering control system.

15. The steeling control system of claim 13, wherein the hydraulic steeling control system includes a front steer spool valve configured to control hydraulic flow to a tie rod check valve, the first valve, the second valve, the third valve, and the fourth valve and to receive instructions from a controller coupled to the one or more sensors and coupled to the hydraulic steering control system regarding the selected steering mode.

16. A method of controlling steering of a milling machine, the method comprising:
coupling first and second hydraulic cylinders configured to steer each of at least two tracks of the milling machine to first and second steering collars coupled to each of the at least two tracks, respectively;
coupling an adjustable hydraulic tie rod extending between the at least two tracks to each of the first and second steering collars; and
activating a hydraulic steering control system including one or more sensors to determine the positions of the at least two tracks, the hydraulic steering control system being coupled to the first and second hydraulic cylinders and the adjustable hydraulic tie rod and configured to vary a steering mode of the at least two tracks between a parallel steeling mode and an Ackerman steeling mode, wherein if one of the one or more sensors fails, the hydraulic steering control system defaults to move the at least two tracks into the Ackerman steering mode.

17. The method of claim 16, wherein the hydraulic steering control system includes a tie rod check valve coupled to the adjustable hydraulic tie rod, wherein the tie rod check valve is a normally closed valve and if the machine is put into a parallel steering mode, the tie rod check valve is energized to allow the adjustable hydraulic tie rod to constantly adjust to keep the at least two tracks parallel.

18. The method of claim 16, wherein the hydraulic steering control system includes a tie rod check valve coupled to the adjustable hydraulic tie rod, wherein the tie rod check valve is a normally closed valve and when the hydraulic steering control system detects that one of the one or more sensors fails, the tie rod check valve is de-energized such that the tie rod check valve closes and such that the adjustable hydraulic tie rod cannot retract due to being blocked by the tie rod check valve, thus putting the machine into the Ackerman steering mode.

19. The method of claim 16, wherein the hydraulic steering control system includes a first valve and a second valve to control left or right steeling by controlling flow into a third valve and a fourth valve which deliver hydraulic fluid to the first and second hydraulic cylinders, respectively, the third valve and the fourth valve are normally open valves to allow proportional fluid flow through to the first and second hydraulic cylinders to turn the at least two tracks either left or right as instructed by the operator.

20. The method of claim 19, wherein the milling machine includes a controller coupled to the one or more sensors and coupled to the hydraulic steering control system, and wherein the hydraulic steering control system includes a front steer spool valve configured to control hydraulic flow to a tie rod check valve, the first valve, the second valve, the third valve, and the fourth valve and to receive instructions from the controller regarding a selected steering mode.

\* \* \* \* \*